United States Patent [19]

Rieger

[11] Patent Number: 4,633,079
[45] Date of Patent: Dec. 30, 1986

[54] FIBER OPTICS AS AN ANGULAR SENSOR

[75] Inventor: Harry Rieger, San Diego, Calif.

[73] Assignee: The United States of America as represented by the Secretary of the Navy, Washington, D.C.

[21] Appl. No.: 749,340

[22] Filed: Jun. 27, 1985

[51] Int. Cl.[4] .................. G01B 11/26; G01D 5/34
[52] U.S. Cl. ..................... 250/227; 250/231 SE; 901/47; 350/96.29
[58] Field of Search .............. 250/231 SE, 227, 561, 250/231 R; 901/46, 47, 9, 12, 15; 73/800, 862.08; 340/685, 686; 350/96.29

[56] References Cited

U.S. PATENT DOCUMENTS

| 4,071,753 | 1/1978 | Fullenwider et al. | 350/96.29 X |
| 4,204,742 | 5/1980 | Johnson et al. | 350/96.29 X |
| 4,294,513 | 10/1981 | Nelson et al. | 350/96.29 |
| 4,408,829 | 10/1983 | Fitzgerald, Jr. et al. | 350/96.29 |
| 4,422,732 | 12/1983 | Ditzik | 350/96.29 X |
| 4,500,870 | 2/1985 | Krohn et al. | 250/231 SE |
| 4,547,665 | 10/1985 | Little et al. | 250/231 SE |
| 4,570,065 | 2/1986 | Pryor | 901/47 |

Primary Examiner—Edward P. Westin
Attorney, Agent, or Firm—Robert F. Beers; Ervin F. Johnston; Thomas Glenn Keough

[57] ABSTRACT

An uncomplicated, compact and environmentally-immune sensor for the degree of articulation of finger joints in a remote underwater vehicle uses a length of an optical fiber connected to each finger joint. As the joint is rotated, the bending of the optical fiber changes the attenuation of light through the fibers and a detector monitoring this change provides a signal that is correlated to the degree of articulation.

10 Claims, 6 Drawing Figures

JOINT ANGLE (a) $\theta = 0°$

FIBER OPTICS AS AN ANGULAR SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Devices for sensing a degree of rotation for angular disposition are critically important in remotely located mechanisms where a visual monitoring cannot be made. The need for accurate angular measuring devices particularly is felt in the broadening and the highly sophisticated field of robotics where precision unattended and unmonitored mechanical functions are to be flawlessly coordinated.

Hand-like manipulators having a number of interdependent articulated sections pose a still more formidable problem since most conventional potentiometer angular sensors are bulky and are susceptible to damage. The potentiometer sensors have shown a somewhat acceptable degree of resolution by providing indications of changed resistance, or voltage, but they are vulnerable to failure particularly when the manipulator or articulated joint is to be used in marine applications, most notably high pressure applications. When a number of potentiometer angular sensors are located in a small volume (on all the joints of a hand-like manipulator), an objectionable bulk is created. In addition, the group of potentiometer sensors cannot be operated without special precautions for underwater or adverse environments that can effect its resistance or the supplied electricity.

Thus, there is a continuing need in the state-of-the-art for an angular position indicator that is compact and reliable under adverse conditions to allow its use in an undersea manipulator or articulated joint to provide accurate angular position readings.

SUMMARY OF THE INVENTION

The present invention is directed to providing an apparatus for sensing the angular position of an articulated joint. A length of optical fiber is mounted adjacent a variable radius curve surface affixed to one member of the joint. The other end of the optical fiber is secured to the other member of the joint such that an illuminating beam passing through the fiber is linearly attenuated as the joint and fiber are rotated. The variable radius surface or snail-shell-like curved surface is so configured to assure that the attenuation of the illuminating beam is linear and a detector responsive to attenuations of the illuminating beam gives an indication of the angle of rotation. Spring tensioning of the optical fiber so that it abuts the snail-shell-like curved surface as the joint is rotated assures that responsive attenuations are indicated. The spring also protects the fiber from failure producing stresses. Using a suitable reflector or doubling the fiber back on itself increases reliability since the light source and detector are removed from the vicinity of the joint to reduce bulk and vulnerability to damage.

A prime object of the invention is to provide for an improved indicator of angular position.

Another object is to provide for an angular position indicator having a higher reliability due to the reduced bulk and absence of vulnerable structure at the area of rotation.

Still another object is to provide for an angular rotation indicator that is immune from electromagnetic interference and the effects of ambient pressurized water.

Yet another object is to provide an angular sensor that is highly suitable for hand-like manipulators in a deep ocean application.

Still another object of the invention is to provide for an angular sensor that is insensitive to ambient pressure and electromagnetic noise and is compact and highly reliable.

Yet another object is to provide for an angular sensor employing a length of optical fiber that varies the attenuation of an illuminating beam to provide an indication of articulation of an associated joint.

Yet a further object is to provide an angular rotation sensor having a fiber wrapped on a variable radius surface for yielding a linear attenuation of a passed beam.

These and other objects of the invention will become more readily apparent from the ensuing specification when taken with the appended claims and the accompanying drawings.

DESCRIPTION OF THE PREFERRED EMBODIMENT

The essence of the invention advantageously incorporates the phenomena of change of attenuation in optical fibers as a result of being bent. Bending an optical fiber safely, without breaking it, produces very little change in attenuation up to a certain angle herein referred to as $\theta$min. As a fiber is continued to be bent along a constant radius, very little change in attenuation occurs beyond a certain angle hereinafter referred to as $\theta$max.

A noticeable and detectable change in attenuation takes place between $\theta$min and $\theta$max; however, the change in attenuation is not nearly linear with respect to the angle. The attenuation variations are larger as the fiber is bent in excess of the $\theta$minimum angle and, as the bend angle approaches $\theta$maximum, the attenuation variation decreases. A fiber exhibits the most favorable indications of being bent if it is prebent to a certain $\theta$minimum angle at an angle which corresponds to a 0° angle or a joint straightened angle. This helps assure that linear attenuation is provided with respect to the angle the joint makes as it flexes throughout its range of intended use. In addition, the fiber, since it does not exhibit a linear attenuation throughout its range of $\theta$minimum to $\theta$maximum, the fiber should be bent over a variable angle or snail-shell-like curved surface that is defined roughly as being similar in shape to the curve known as the spiral of Archimedes.

Prebending an optic fiber so that it assumes the angle $\theta$minimum gives the capability for detection of any angle (even if it is less than $\theta$minimum) while a variable radius snail-shell-like curved surface provides the linearity of attenuation with respect to the angle of interest ($\delta\alpha/\delta\theta$ = a constant, where $\alpha$ = attenuation).

Figure 1:
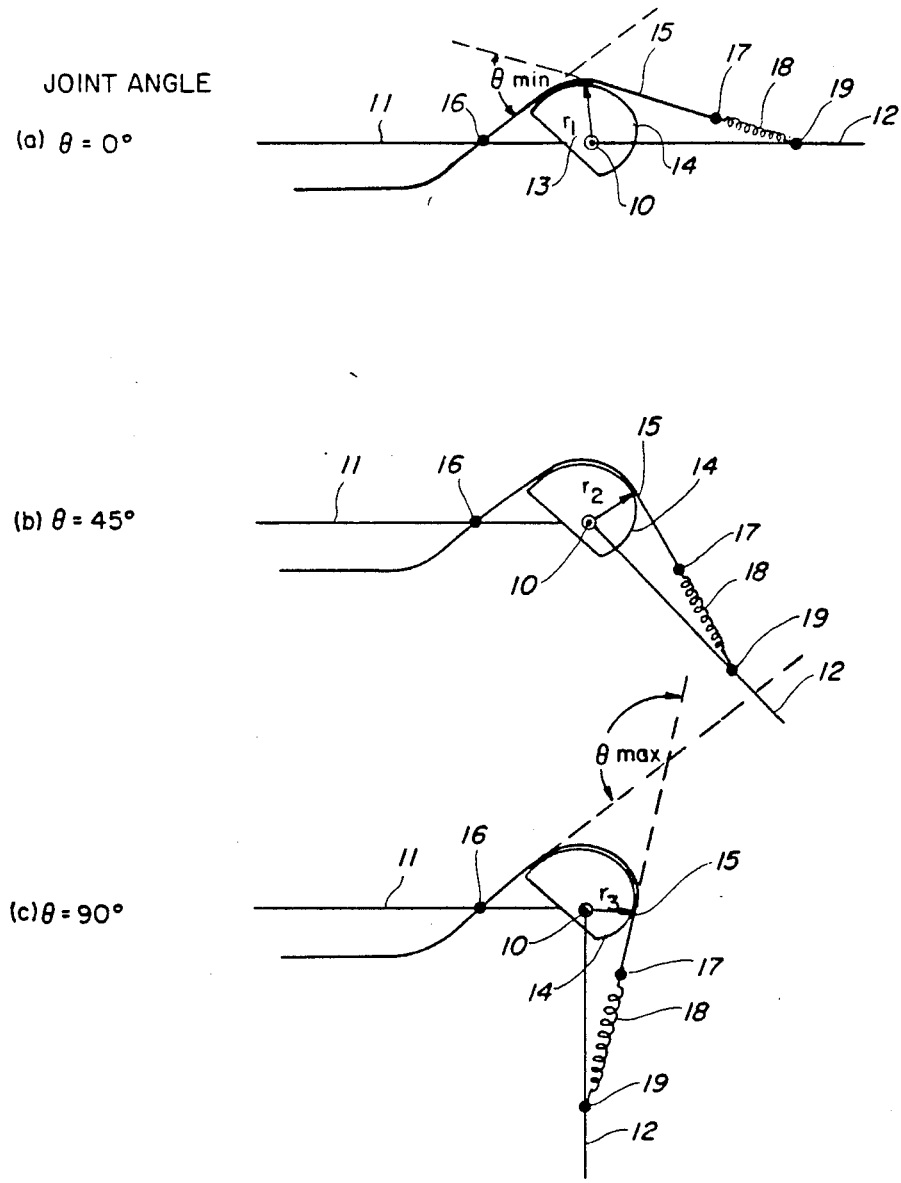
FIGS. 1a, 1b, and 1c show a schematic of a joint with the fiberoptic sensor.

Referring now to FIG. 1 and in particular to FIG. 1a, a schematic is shown of a joint 10 formed of two arms 11 and 12. The arms and joint are depicted as having a stick-like configuration only for the purpose of simplifying the explanation. It is understood that all could be massive structures or delicate figures depending on the application. A block 13 is shaped with a variable radius, or a snail-shell-like curved surface 14 and is rigidly attached to a first arm 11 by suitable means.

An optical fiber 15 also is firmly attached on arm 11 at a point 16 and extends from the joint. The other end 17 of fiber 15 is attached to second arm 12 at a point 19 through an elastic material or spring 18. The function of the elastic material or spring is twofold. First, it holds the fiber on the desired curvature of snail-shell-like curved surface 14. Secondly, it prevents the buildup of any destructive strains that might otherwise be transmitted from a rigid attachment to the arm as the joint articulates.

When the joint is straight as shown in FIG. 1a, the block is noted as being premounted on arm 11 to establish $\theta$min at 0° rotation since the fiber will be bent to its angle $\theta$min or larger. As the joint is rotated, noting FIG. 1b, the fiber is held against surface 14 and experiences a bending over curve of smaller radius ($r_3 < r_2 < r_1$) in FIGS. 1a, 1b and 1c, respectively. By choosing the proper rate of curvature of curved surface 14 for a particular fiber, the change in attenuation of light through the fiber is made to be linear between the angle from $\theta$minimum through $\theta$maximum. In the illustrative sequence, FIG. 1c is indicated as being that angle at which $\theta$maximum occurs, it being understood that in a particular fiber this angle may be different than the approximate 90° rotation from that shown in FIG. 1a.

The embodiment thusly described concerns only a two-dimensional or single polar bend of a fiber. Higher angles and extended attenuation can be obtained as a variable radius 14 is extended in a third dimension. The shape of a snail-shell surface for a three-dimensional design would be appropriate or two orthogonally disposed variable radius curves for one fiber could be chosen.

Figure 2:
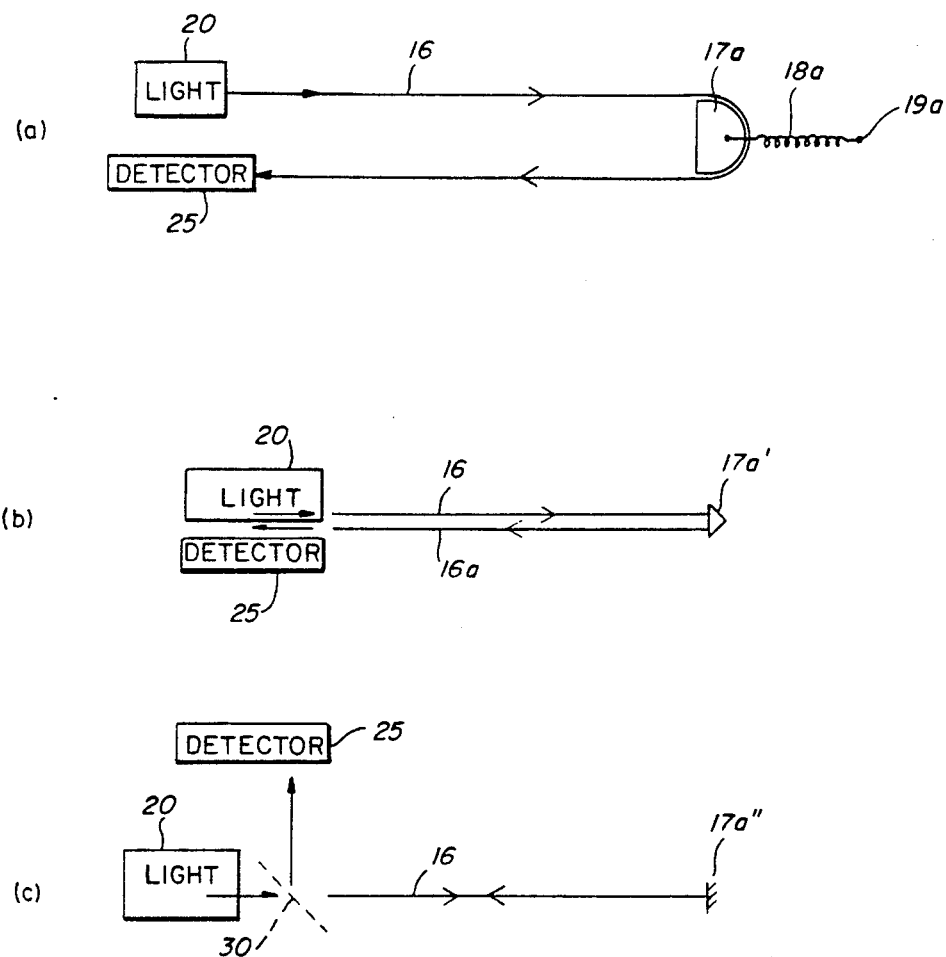
FIGS. 2a, 2b and 2c are illustrations of modifications of the invention which allow the remote location of the light source and detector.

In order to eliminate the electronics from the area of the joints a return path for illuminating light is provided. FIGS. 2a, 2b and 2c show a few possibilities of how this is accomplished. Noting FIG. 2a, an illuminating light source 20, a laser diode, LED, etc. transmits light through fiber 16 that is wrapped about a fiberoptic holder at 17a. The fiber continuously reaches to a detector 25, that is located adjacent the light source. The holder is spring biased by a spring 18a connected to an anchor point 19a on the second arm. The variable radius curve is not shown to avoid cluttering the drawings, it is understood that the fiber is arranged to be bent as described above. The light source and detector are remotely placed from the joint at a safe and structurally unobtrusive location.

The arrangement of FIG. 2b shows a side-by-side illuminating source 20 and detector 25 operatively associated with a pair of fibers 16 and 16a. Both are wrapped over the snail-shell-like curved surface, not shown, and terminate in a total internal reflecting prism 17a' located at the end of the fibers. The prism is connected to a spring that is attached to the second arm. Fiber 16 transmits light to the prism and fiber 16a transmits the reflected illuminated light back to the detector for responsive indications.

Another option is possible by coating the end of fiber 16 with a reflecting coating 17a", see FIG. 2c. Only a single fiber 16 is held against a variable radius curve on a block, not shown, so that a beamsplitter 30 will couple illuminating light from a source 20 to be detected by a detector 25.

Such a sensor is immune to electromagnetic noise that can interfere with electronics. It is easily adapted to different environments such as a harsh deep submergence application. The sensor itself may be a fiber of less than 100 microns in diameter and therefore physically does not interfere with a complicated mechanism such as a multijointed articulated manipulator. High densities of sensors in a small volume are provided.

Obviously many modifications and variations of the present invention are possible in the light of the above teachings. It is therefore to be understood that within the scope of the appended claims the invention may be practiced otherwise than as specifically described.

What is claimed is:

1. An apparatus for sensing the angular position of an articulatory joint having first and second arms comprising:
   means mounted on the first arm of the articulatory joint for providing a snail-shell-like curved surface;
   means for providing illuminating light;
   means affixed on the snail-shell-like curved surface and connected to the second arm and disposed in a partially contiguous abutment on a portion of the snail-shell-like curved surface providing means to receive illuminating light therethrough from the illuminating light providing means for changing its attenuation of light passed therethrough in proportion to the degree of angular bending thereof about the snail-shell-like curved surface providing means; and
   means disposed to receive illuminating light from the illuminating light providing means that has passed through the attenuation changing means for producing a signal representative of the attenuation of the illuminating light as the articulatory joint is rotated thereby indicating the angle of rotation.

2. An apparatus according to claim 1 in which the illuminating light providing means and the attenuation signal producing means are remotely disposed from the articulatory joint.

3. An apparatus according to claim 2 in which the attenuation changing means is a length of optical fiber.

4. An apparatus according to claim 3 further including:
   means coupled to the optical fiber and the second arm for resiliently connecting therebetween to reduce the possibility of transmitting destructive forces thereto.

5. An apparatus according to claim 4 in which the length of optical fiber is mounted on the snail-shell-like curved surface to be bent within a preestablished minimum angle and maximum angle.

6. An apparatus according to claim 5 in which the shape of the snail-shell-like curved surface is shaped to linearly attenuate the illuminating light passing through the fiber as the fiber is bent over the curved surface as the articulatory joint is rotated.

7. An apparatus according to claim 6 in which the resiliently connecting means is a spring that also serves to securely hold the optical fiber on the snail-shell-like curved surface during the angular bending thereof.

8. An apparatus according to claim 7 further including:
   means for directing attenuated illuminating light from the articulatory joint to the attenuation signal producing means.

9. An apparatus according to claim 8 in which the attenuated illuminating light directing means is a continuous length of the optical fiber wrapped back on itself to the attenuation signal producing means.

10. An apparatus according to claim 8 further including:
   means operatively coupled to the optical fiber for reflecting the attenuated illuminating light to the attenuation signal producing means.

* * * * *